United States Patent [19]
Hübner

[11] 3,872,364
[45] Mar. 18, 1975

[54] EXTINGUISHING ARRANGEMENT FOR THE INVERTERS OF AN ELECTRIC MOTOR

[75] Inventor: Klaus Hübner, Erlangen, Germany

[73] Assignee: Siemens Aktiengesellschaft, Munich, Germany

[22] Filed: Sept. 20, 1973

[21] Appl. No.: 399,157

[30] Foreign Application Priority Data
Sept. 22, 1972 Germany............................ 2246592

[52] U.S. Cl................ 318/227, 318/254, 321/45 C
[51] Int. Cl. ............................................. H02p 1/26
[58] Field of Search ...... 321/45 C, 4; 318/227, 345, 318/138, 254, 231

[56] References Cited
UNITED STATES PATENTS

| | | |
|---|---|---|
| 3,588,667 | 6/1971 | Duff et al..................... 321/45 C X |
| 3,612,973 | 10/1971 | Kuniyoshi ..................... 321/45 C X |
| 3,621,366 | 11/1971 | Duff................................ 321/45 C |
| 3,652,874 | 3/1972 | Partridge........................... 321/45 C |
| 3,665,286 | 5/1972 | Ohno et al...................... 318/345 X |

Primary Examiner—William H. Beha, Jr.
Attorney, Agent, or Firm—Kenyon & Kenyon Reilly Carr & Chapin

[57] ABSTRACT

An improved arrangement for extinguishing the inverter thyristors supplying current to an electric motor in which the output of the intermediate DC link supplying the inverter has placed across it two controlled rectifiers and a reversing choke along with a commutating capacitor connected in parallel with the reversing choke and one of the control rectifiers thereby permitting the motor current to be commutated even at operating speeds slightly above zero without the need for expensive circuitry.

4 Claims, 2 Drawing Figures

EXTINGUISHING ARRANGEMENT FOR THE INVERTERS OF AN ELECTRIC MOTOR

BACKGROUND OF THE INVENTION

This invention relates to electric motors in general and more particularly to an improved extinguishing arrangement for use with converter-fed motors.

Motors which are fed from a converter which is supplied with current from a DC link are known in the art. Such an arrangement is shown, for example in the Journal "Brown-Boveri Mitt." 54, (1967) No. 5/6, pages 217–224. Another such motor is shown in Siemans Zeitschrift 45, (1971), No. 10, pages 753–757. Converter motors of this type are generally rotating field machines of the synchronous type which are supplied with voltage from a single or three phase system of constant voltage and frequency through a controlled rectifier, an intermediate DC link and an inverter. The inverter is controlled as a function of the load with the machine supplying reactive commutation power.

In such converter motors, however, reactive power required for commutation of the motor current is present only above a given operating speed. For operation in a speed range which lies between zero and about one-tenth of the nominal speed of the converter motor, separate starting and commutating circuits must be provided to provide for extinguishing of the commutation devices.

Various systems have been used for this purpose. One such system is shown in German Offenlegeschrift No. 1,538,150, in which a multi-phase machine with wide connector stator windings is supplied through an intermediate link with an impressed voltage. An auxiliary extinguishing arrangement is provided in this system comprising two series connected controlled rectifiers which bridge the output terminals of the intermediate link and between whose junctions and the neutral point of the stator winding, a commutation capacitor is connected. With this auxiliary extinguishing arrangement, the inverter devices, which typically will be thyristors and control the motor current, can be extinguished in synchronism with signals from a rotor position transmitter. Such an auxiliary extinguishing arrangement for the devices used in the inverter should operate independently of the short circuit power of the supply system, and, in order to avoid major dips in the torque at the motor shaft, requires a commutation time which is as short as possible. In addition, such an auxiliary extinguishing arrangement should operate safety under no load condition. That is, its proper function should also be maintained when the load current is intermittent.

None of the presently known circuits fully meet in a satisfactory manner all these requirements. For example, a converter shown in Siemens Zeitschrift 45 (1971), No. 4, pages 195 – 197 has an intermediate DC link which supplies a three phase asynchronous machine. Since a machine of this nature cannot supply reactive power for the commutation of the converter over its entire speed range, a commutation aid is always necessary. Thus, in this system, a three phase commutation arrangement is provided in the intermediate link for use in commutation. In German Offenlegeschrift, No. 1,413,481 an intermediate link converter with an impressed DC voltage and an inverter whose rectifier devices must be shunted by reactive current diodes is shown. This intermediate converter can be used for feeding an asynchronous machine or as a reversible drive with a DC motor. In the converter, the output terminal of the intermediate link are bridged by a series circuit comprising a controlled and an uncontrolled device and an inductance, with the controlled device shunted by a series resonant circuit and the uncontrolled converter device and the inductance shunted by a quenching capacity. In this intermediate link converter the commutation process is initiated by firing the controlled device in the series circuit. Since during the commutation process the quenching capacitor is charged with only a slight negative charge, the parallel-connected series resonant circuit is provided to extinguish the controlled device. Such a circuit requires that the controlled converter device be designed for large loads. Such is particularly true if the intermediate link converter is to be used for the speed control of a motor. In such a case the obtainable frequency limit of the drive is very low.

Thus, there is a need for an auxiliary extinguishing arrangement having the characteristics noted above. That is, it must effectively commutate the motor current at very low operating systems and should be able to be constructed with a minimum of expense.

SUMMARY OF THE INVENTION

The present invention provides an auxiliary commutating arrangement which fills all the above noted needs. The essential components of the arrangement of the present invention comprise a circuit placed across the output of the intermediate DC link which includes first and second controlled rectifiers and a reversing choke. The first controlled rectifier is connected in series with the commutation capacitor across the output of the DC link. The series combination of the second controlled rectifier and the reversing choke are wired in parallel with the commutation capacitor. The first controlled rectifier is arranged to be fired in response to a converter command indicating that commutation is required. In response to this input the converter control means which normally fire the controlled rectifier devices therein are inhibited. The commutation capacitor then extinguishes the previously conducting control rectifier in the inverter. This results in a discharge of the commutation capacitor which is sensed by a voltage detector provided in the circuit. Upon the sensing of a predetermined voltage indicating that the first controlled rectifier has been extinguished, means are provided to generate a firing pulse for the second controlled rectifier to permit reversed charging of the commutation capacitor. A second voltage detector circuit senses the voltage at the capacitor and upon detecting sufficient voltage at the capacitor enables the control means for the converter allowing commutation to occur. The cost of the auxiliary extinguishing arrangement according to the present invention is extremely low.

Essentially what occurs during operation is that the current in the entire motor is made zero at the beginning of each commutation of the inverter. This in turn makes it possible to switch on a new group of rectifiers during a short currentless interval. The auxiliary extinguishing arrangement functions independently of the short circuit power of the supply system. Short commutation times are obtained thus causing only slight depths in the torque. The auxiliary extinguishing arrangement operates safety under no-load conditions, i.e., it is also fully operable with intermittent DC current. A charging device having only a small capacity is required for the initial charging of the communication capacitor with the subsequent charging provided by the circuit itself.

DETAILED DESCRIPTION OF THE PREFERRED EMBODIMENT

Figure 1:
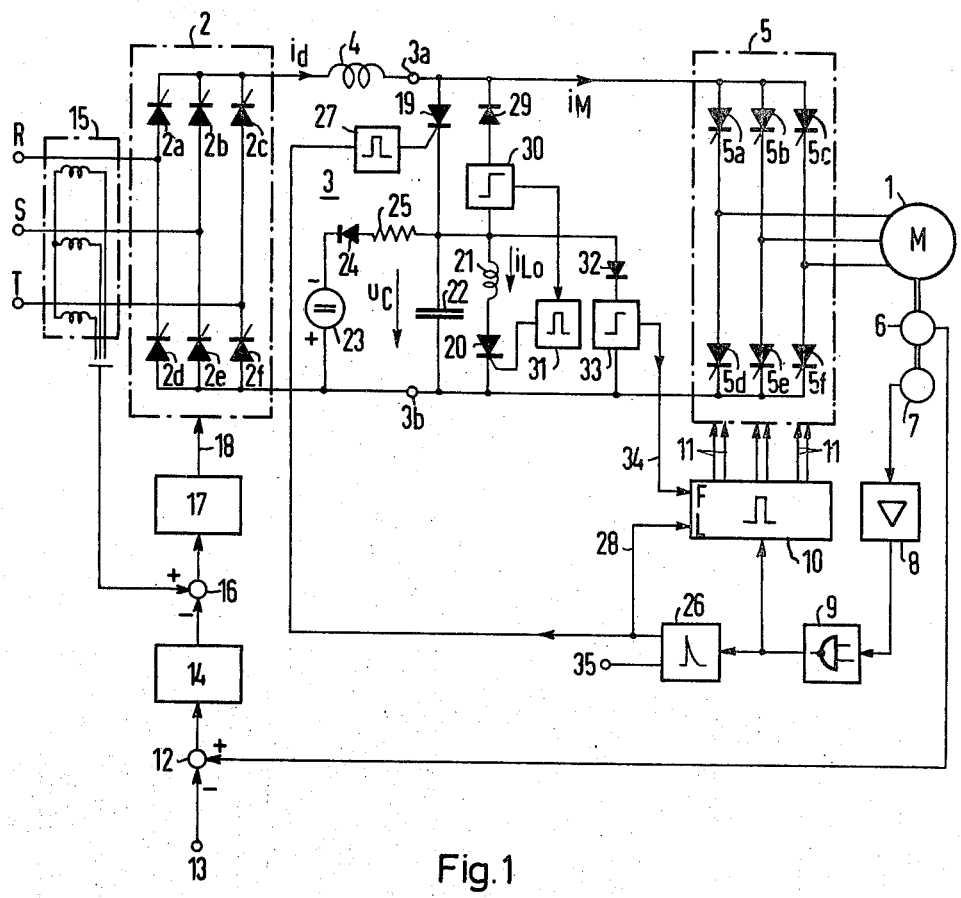
FIG. 1 is a circuit diagram of an inverter-fed motor having the circuit of the present invention installed.

FIG. 1 illustrates an inverter-fed synchronous motor 1. Power for the motor is obtained from the three phases R, S and T of a line. The line voltage is supplied to a control rectifier bridge 2 wherein the AC voltage is rectified and converted to a DC voltage resulting in a DC current $i_d$. The DC is supplied through the intermediate link 3 to a controlled inverter 5 wherein the DC current is commutated to the three phases of the motor winding. The rectifier bridge in conventional fashion comprises the controlled rectifiers 2a through 2f. The converter rectifiers are arranged in similar bridge fashion and comprise the rectifiers 5a through 5f. Since the intermediate link inverter operates with impressed current in the intermediate link, reactive current diodes for the controlled rectifiers 5a to 5f of the inverter 5 need not be provided. In a typical application the controlled rectifiers 2a to 2f and 5a to 5f will be thyristors. The rotor of motor 1 has coupled thereto a tachometer generator and a rotor position transmitter 7. The latter may, for example, be of the permanent magnet type or may be one equipped with Hall effect generators. The signals from the rotor position transmitter 7 are provided through an amplifier 8 and a logic circuit 9 to a control unit 10 which provides as outputs on lines 11 the firing pulses for the thyristors 5a through 5f. Such operation is well known in the art and has been used in many systems. For example, see German Pat. No. 1,240,980. The tachometer output is provided to a summing junction 12 where it is compared with a preset input value provided from terminal 13 to develop an an error signal. This error signal is then fed to a speed control 14 the output of which is compared at a second summing junction with a sensed current obtained from current transformer windings at the three phase input. The error signal thereby developed is provided to a current control 17 which on line 18 provides outputs to control the rectifiers 2a to 2f to cuase the required amount of current to be provided in the DC link 3. Again, a control arrangement such as this is conventional. For example such an arrangement is shown in German Pat. No. 2,035,995.

The circuit of the present invention is placed across the terminals 3a and 3b of the DC link. This circuit comprises essentially a first controlled rectifier 19, a second controlled rectifier 20 and a reversing choke 21. The reversing choke 21 and second rectifier 20 are shunted by a commutation capacitor 22. These four elements comprise the essential parts of the circuit of the present invention, and connect with the windings of the synchronous machine which provides the commutation inductance. Preferably the controlled rectifiers 19 and 20 will be thyristors.

Voltage source 23 which delivers a voltage of magnitude $V_H$ is coupled through a diode 24 and a resistor 25 to the junction of the commutation capacitor and the first thyristor 19. This voltage is used for the initial charging of the capacitor 22 as will be described in more detail below. The firing input for the first controlled rectifier 19 is taken from the output of logic means 9 through a differentiator 26 and a pulse transmitter 27. Pulse transmitter 27 may comprise a circuit such as one-shot multi-vibrator. Output of the differentiator 26 is also connected as an input to the control circuit 10 which provides the firing pulses to the rectifiers 5a through 5f and is adapted to disable the outputs from that circuit. For example, the control circuit 10 may include a flip-flop which is set to provide disabling inputs to gates therein upon an input on line 28.

The first controlled rectifier 19 is shunted by a series circuit comprising a diode 29 and voltage detector 30. The diode 29 is connected with reverse polarity to the rectifier 19. The output of the voltage detector 30 is coupled to a second pulse transmitter 31 which similarly may be a one-shot or the like. This provides the firing input for the second controlled rectifier 20. The pulse transmitter 31 responds to an output from the voltage detector 30 to transmit a pulse to fire the controlled rectifier 20. The voltage detector 30 may, for example, be a Zenner diode having a breakdown voltage which is the threshold value to be detected by the detector 30. Preferably the output will be coupled to the pulse transmitter 31 through an optoelectric coupling element for example, a light barrier, in order to provide potential separation and to avoid any delay in the transmission of the signal. In similar fashion, the commutation capacitor 22 and series circuit comprising the choke 21 and controlled rectifier 20 in parallel therewith also has shunted across it a circuit comprising diode 32 and a second voltage detector 33. In this case the diode 32 has the same polarity as the controlled rectifier 20. The output of the voltage detector 33 is coupled as an enabling input to the control circuit 10. (i.e., if a flip-flop is included therein it can be used to reset the flip-flop enabling gates in the circuit) Thus, an output on line 34 from the voltage detector 33 will enable the control circuit 10 to permit firing pulses to be provided on lines 11 to fire the controlled rectifiers therein. The voltage detector 33 may be also a Zenner diode as is voltage detector 30.

At operating speeds which are higher than one-tenth of the nominal speeds $n_N$, the commutation of the motor current $i_m$ takes place in the converter motor shown on FIG. 1, for example, a commutation from the thyristor 5a to the thyristor 5b, through the machine voltages generated in the synchronous machine. However, for operating speeds which are lower than one-tenth of the nominal speed, the machine voltage is not sufficient for commutation. This requires that the above described circuit to come into use to provide an auxiliary extinguishing arrangement during commutation.

Figure 2:
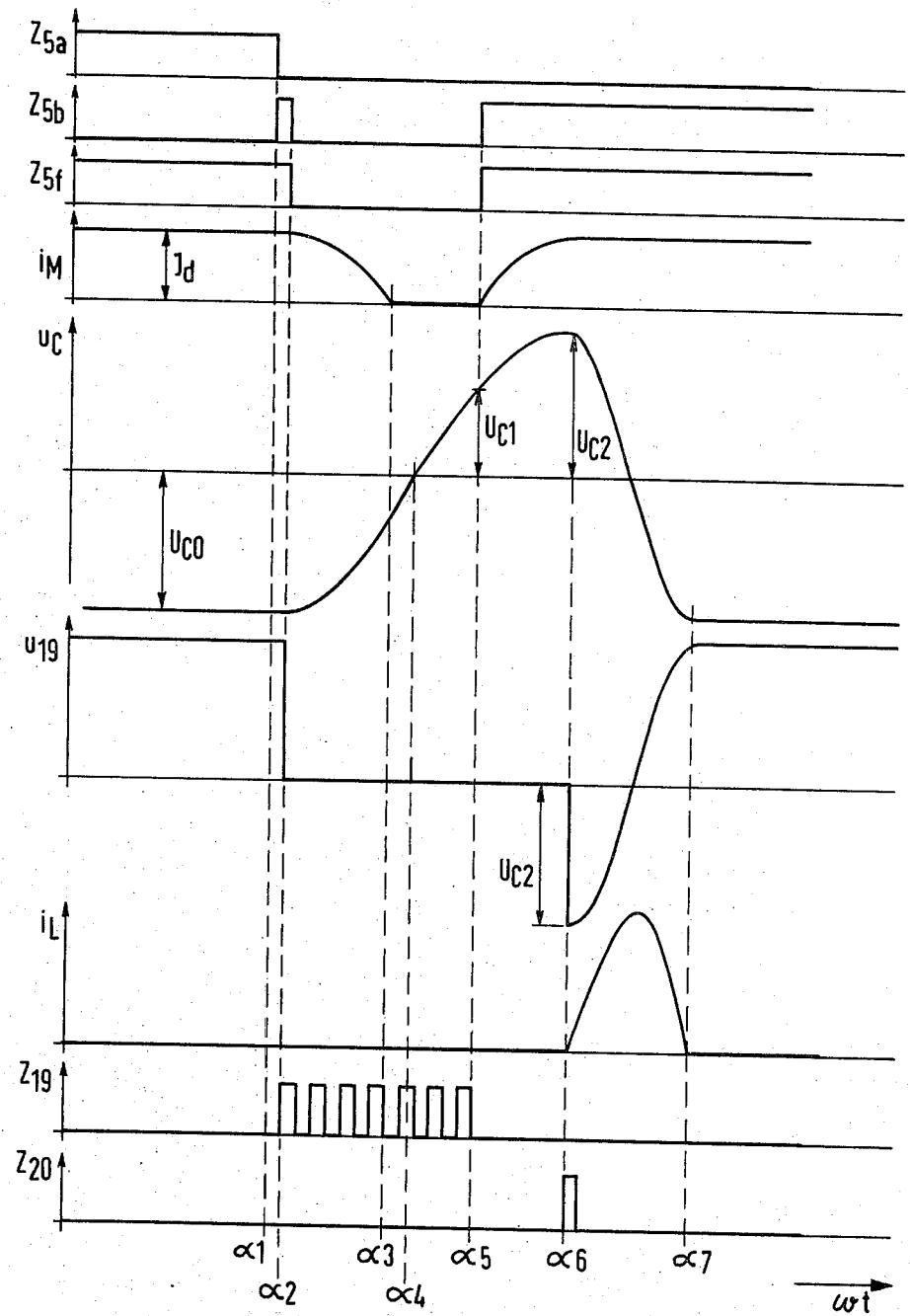
FIG. 2 is a timing diagram illustrating operation of the circuit of the present invention.

To illustrate the manner in which the circuit of the present invention operates reference should be had to FIG. 2 whereon the firing pulses Z for the rectifiers 5a, and 5b, and 5f of inverter 5 along with the firing pulses Z for the controlled rectifiers 19 and 20 of the auxiliary extinguishing arrangement, the motor current $i_m$ the voltage $U_c$ at the capacitor 22 and the voltage $U_{19}$ at the rectifier valve 19 and the current $i_L$ which flows in the reversing choke are plotted against wt. It is assumed in the below discussion that the rectifiers 5a and 5f of the inverter are conducting and that the motor current is to be commutated from the controlled rectifier 5a to the controlled 5b and further that the capacitor 22 is charged as shown.

Commutation is initiated at time $\alpha_1$, in conventional fashion by a firing pulse $Z_{5b}$ which is generated in response to an output from the position transmitter 7. This output in addition to being provided to the control circuit 10 is also provided to the differentiator 26 where it is differentiated and provided to the pulse transmitter 27 whereby a pulse is generated turning on the controlled rectifier 19. The output of the differentiator also is provided as an input to the control circuit 10 disabling that circuit and causing the firing pulse $Z_{5b}$ to be present only for a short period of time, which time is insufficient to permit the rectifier 5b to permantently go into a conducting state. At time $\alpha_2$, the rectifier 19 is turned on as shown. This permits the capacitor 22 to discharge and extinguish the current-carrying rectifiers 5a and 5f. This results in the motor current $i_m$ becoming zero at the time $\alpha_3$. The charge on the capacitor continues to be reversed by the constant intermediate link current $i_d$ which continues to flow, until a time $\alpha_4$ the capacitor voltage $U_c$ is zero. The time $T=(1/\omega)(\alpha_4 - \alpha_3)$ must be at least equal to the recovery time of the rectifiers 5a and 5f in the inverter. Since the control circuit 10 remains disabled because of the input 28, the capacitor 22 will continue to be charged until at time $\alpha_5$ the detector stage 33 which is set to trigger at a voltage $U_{c1}$ enables the circuit 10 via line 34. As shown on the drawing the controlled rectifiers 5b and 5f then receive their firing signal and motor current $i_m$ begins to flow. The capacitor voltage $U_c$ continues to flow until at the time $\alpha_6$ the motor current has again reached the magnitude of the intermediate link current $i_d$. The commutation process in inverter 5 is thereby completed.

In order to charge the capacitor 22 with the correct charge for the next commutation, the rectifier 20 which can be referred to as a reversing thyristor is turned on in response to an output from the pulse transmitter 31 responding to an input from voltage detector 30. This occurs at the point where the blocking voltage $U_{c2}$ suddenly increases as a result of the rectifier 19 being extinguished. This results in the capacitor being reversed and through the transfer of energy stored in the choke 21 causes the capacitor to become charged with the proper polarity for the next commutation. The delayed release of the pulses of the inverter, taken from the time $\alpha_5$ on has the effect that the final positive voltage $U_{c2}$ of the capacitor is higher than the voltage resulting from the commutation process itself. This voltage is expressed by the following equation $$U_{c2} = U_{c1} + L_{M/C} \pm i_d{}^2$$

where $L_M$ is the stray inductance of the motor involved in the commutation process.

The trigger voltage $U_{c1}$ of the voltage detector 33 is selected such that the losses occurring during the subsequent reversal process are accounted for and that an initial voltage $U_{c0}$ is obtained which if necessary, will be capable of commutating a current considerably higher than that which was commutated in the previous commutation. In order to cause the extinguishing arrangement to operate safely during no-load conditions, i.e., so that it maintains its full function even for intermittent current $i_d$, the controlled rectifier 19 is provided with a continuously pulsed firing signal $Z_{19}$ until the voltage detector stage 33 provides an output. Otherwise, if the intermediate link current $i_d$ were intermittent between time $\alpha_2$ and the time $\alpha_5$ due to a control event at the control unit of the rectifier bridge 2, the controlled rectifier 19 would be extinguished. The charge of the capacitor 22 could then no longer be reversed and the firing circuit 10 no longer be enabled through the voltage detector 33. This would cause the inverter 5 to remain without current. However, because of the continuous firing signal for the thyristor 19 which preferably will be a sequence of individual high-frequency pulses, the capacitor will continue to be charged through the rectifier 19 and provide proper functioning when the intermediate link current $i_d$ returns.

Although the commutation process of the present arrangement takes longer than the usual, this has no detrimental effect on the function of auxiliary extinguishing arrangements. In regard to the derivation of the firing command for the reversing thyristor 20, it should ne noted that the time span from the start of commutation at $\alpha_2$ to the point $\alpha_6$ at which the firing command is provided is load dependent for the rectifier 20 and can thus vary in duration. The firing of the rectifier 20 can not take place a fixed period of time after the time $\alpha_2$, for example. Rather the possibility of the rectifier 20 being fired and opened while the rectifier 19 is still conducting is prevented. Otherwise, a completely different flow of current in the main commutation circuit would result and proper commutation would no longer take place. This is assured by the described firing sequence for the rectifiers 19 and 20 since the firing of the rectifier 20 is obtained from the presence of the blocking voltage at the rectifier 19. Thus, it is assured that the reversing thyristor 20 is not fired until commutation in the inverter 5 is completed. The auxiliary voltage source 23 can be a low power design since it is only required for the initial charging of the commutation capacitor. The recharging of this capacitor takes place in the above described manner through the firing delay for the rectifiers 5a to 5f of inverter 5. In addition the voltage source can be used to make up for small leakage losses in the capacitor and the internal consumption of the detector 30 where the drive is operated in the generator mode. It should further be noted that the entire extinguishing arrangement can be easily disconnected simply by cutting off the differentiator 26 when the minimum speed of about 10 per cent of nominal speed is reached. A terminal 35 is provided at the input of the differentiator 26 for this purpose.

Thus all of the required operating advantages noted above are obtained in the present circuit. An auxiliary circuit for starting and low-speed operation is provided which is inexpensive and provides reliable commutation of the motor speed. It should also be noted that the auxiliary extinguishing arrangement described above is not suited only as a starting circuit for converter motors. It can be used as a fully operable device with any converter which includes an intermediate current link regardless of the type of machine being driven. For example, the machine may be a synchronous three-phase machine. These and other modifications may be made without departing from the spirit of the invention which is intended to be limited solely by the appended claims.

What is claimed is:

1. In a system including an electric machine coupled to an intermediate link converter including an inverter and control means associated therewith, an improved auxiliary extinguishing arrangement for inverter rectifiers of the inverter comprising:
   a. a first controlled rectifier and a commutation capacitor in series across the intermediate link;
   b. a second controlled rectifier and a reversing choke connected in series, with the series combination of said second controlled rectifier and said choke in parallel with said commutation capacitor;
   c. the control means associated with said inverter providing firing pulses thereto; and
   d. a first voltage detector arranged to detect the voltage at said capacitor, said voltage detector having an output coupled to said control means, said control means being responsive to be enabled by the output of said first voltage detector to permit firing pulses to be provided to the controlled rectifiers in said converter.

2. The invention according to claim 1 and further including a second voltage detector arranged to sense the voltage at said first controlled rectifier and means responsive to said second voltage detector to provide firing pulses to said second controlled rectifier, said second voltage detector arranged to have an output when a reverse voltage is present at said first controlled rectifier.

3. The invention according to claim 2 and further including means to generate a firing pulse for said first controlled rectifier, the output of said means being further provided as an input to said control means said control means including means to block firing outputs to the inverter therefrom in response to said input.

4. The invention according to claim 3 and further including an auxiliary DC voltage source coupled to said capacitor through a resistor and diode, said auxiliary voltage source providing for initial charging of said capacitor.

* * * * *

UNITED STATES PATENT OFFICE
CERTIFICATE OF CORRECTION

PATENT NO. : 3,872,364
DATED : March 18, 1975
INVENTOR(S) : Klaus Hübner

It is certified that error appears in the above-identified patent and that said Letters Patent are hereby corrected as shown below:

In Column 1, line 12, change "Siemans" to --Siemens--

In Column 3, line 3, change "communication" to --commutation--

In Column 4, line 30, change "optoelectric" to --opto-electronic--

Signed and Sealed this nineteenth Day of August 1975

[SEAL]

Attest:

RUTH C. MASON
Attesting Officer

C. MARSHALL DANN
Commissioner of Patents and Trademarks